United States Patent [19]
Mitani

[11] Patent Number: 4,542,263
[45] Date of Patent: Sep. 17, 1985

[54] SPEECH CONTROL CIRCUIT
[75] Inventor: Tokiyoshi Mitani, Tokyo, Japan
[73] Assignee: OKI Electric Industry Co., Ltd., Tokyo, Japan
[21] Appl. No.: 587,240
[22] Filed: Mar. 7, 1984
[51] Int. Cl.⁴ .............................................. H04M 1/60
[52] U.S. Cl. .............................. 179/81 B; 179/100 L
[58] Field of Search ............... 179/81 B, 100 L, 81 R, 179/81 A

[56] References Cited
U.S. PATENT DOCUMENTS

| | | | |
|---|---|---|---|
| 3,660,603 | 5/1972 | Andersen | 179/81 B |
| 4,025,728 | 5/1977 | Jacobson | 179/81 B |
| 4,052,562 | 10/1977 | Andersen | 179/100 L X |
| 4,068,092 | 1/1978 | Ikoma et al. | 179/81 B |

Primary Examiner—James L. Dwyer
Attorney, Agent, or Firm—Martin M. Novack

[57] ABSTRACT

A speech control circuit comprises, associated with a transmission channel, a transmission variable gain amplifier (VGA$_T$) coupled with the output of a microphone, a transmission signal detecting circuit (SDC$_T$) coupled with the output of the amplifier (VGA$_T$) for detecting signal from the microphone when the level of an amplified signal exceeds a threshold level which is switched to two levels, a first transmission time constant circuit (FTC$_T$) for prolonging the rear edge of an output signal of the circuit (SDC$_T$) by a first time constant $\tau_1$, and a second transmission time constant circuit (STC$_T$) for prolonging the rear edge of the output signal of the circuit (SDC$_T$) by a second time constant $\tau_2$. The speech control circuit further comprises similar elements associated with the reception channel. The transmission channel and the reception channel are coupled with a line. The first transmission time constant circuit (FTC$_T$) controls the transmission switching circuit (SC$_T$) inserted into a transmission channel and a reception variable gain amplifier (VGA$_R$). The second transmission time constant circuit (STC$_T$) controls a reception signal detecting circuit (SDC$_R$). The first time constant $\tau_1$ is longer than the second time constant $\tau_2$.

6 Claims, 6 Drawing Figures

SPEECH CONTROL CIRCUIT

BACKGROUND OF THE INVENTION

This invention relates to a speech control circuit and, in particular, relates to such a circuit which is utilized in a handsfree telephone or a loudspeaker telephone and which provides the correct switching between a transmission mode and a reception mode of the telephone in spite of the presence of an acoustic coupling or a leakage coupling between a transmission side and a reception side.

A handsfree telephone or a loudspeaker telephone has a transmission channel which transmits a transmission speech signal from a microphone to a line such as a telephone line, a reception channel which receives a reception speech signal from the line and energizes a speaker, and a hybrid circuit which couples the transmission channel and the reception channel to the line. As is well known, the handsfree telephone needs to operate in either one of a transmission mode or a reception mode.

A prior speech control circuit for controlling switching between the two modes is explained below with reference to FIG. 1.

In this figure, the symbol M is a microphone, $SC_T$ is a transmission switching circuit having a switching control input which is inserted into a transmission channel which is defined as a line between (a) and (b), SP is a speaker, $SC_R$ is a reception switching circuit having a switching control input which is inserted into a reception channel which is defined as a line between (c) and (d), and HYB is a hybrid circuit which couples the transmission channel and the reception channel to a line such as a telephone line. The block surrounded by the dotted line is a speech control circuit for controlling switching actions of the transmission switching circuit $SC_T$ and reception switching circuit $SC_R$ in accordance with the speech level in each channel.

The speech control circuit is composed of a transmission amplifier $A_T$, a reception amplifier $A_R$, a signal detector SD, a time constant circuit TC, and a driver circuit DC.

The output of microphone M is connected to the input of the transmission amplifier $A_T$ for amplifying the transmission speech signal from the microphone M, the output of which is connected to one input of the signal detector SD. The output (c) of the hybrid circuit HYB is connected to the input of the reception amplifier $A_R$ from the line through the hybrid circuit HYB, the output of which is connected to the other input of the signal detector SD. The voltage $V_t$ of the transmission amplifier $A_T$ and the voltage $V_r$ of the reception amplifier $A_B$ are compared with each other by the signal detector SD in order to determine the operational mode of the handsfree telephone.

In the comparison operation, if the voltage $V_t$ is higher than the voltage $V_r$, an output pulse in the form of square-wave is produced, thus, the operational mode is determined to be the transmission mode. On the other hand, when the voltage $V_r$ is higher than the voltage $V_t$, no output pulse is produced, and then the operational mode is determined to be the reception mode. When $V_r = V_t = 0$ is satisfied, the operational mode is the reception mode.

The output of the signal detector SD is connected to the input of the time constant circuit TC for elongating a pulse-width of an output pulse from the signal detector SD by a predetermined time constant in order to prevent the frequent switching between the transmission mode and the reception mode. The output of the time constant circuit TC is connected to the driver circuit DC having two outputs, one of which is connected to the switching control input of the transmission switching circuit $SC_T$, the other of which is connected through a inverter INV to the switching control input of the reception switching circuit $SC_R$.

The driver circuit DC controls the transmission switching circuit $SC_T$ and the reception switching circuit $SC_R$ in accordance with the output signal of the time constant circuit TC so that either one of two switching circuits is ON, and the other is OFF. On the one hand, when an elongated signal output pulse from the time constant circuit TC is supplied to the input of the driver circuit DC, this pulse is supplied to the switching control input of the transmission switching circuit $SC_T$, thereby causing it to be ON. Therefore, a transmission speech signal from the microphone M is transmitted to the line through the hybrid circuit HYB. Simultaneously, that pulse is inverted by the inverter INV and supplied to the switching control input of the reception switching circuit $SC_R$, thereby causing it to be OFF. Therefore, a reception speech signal from the line is not applied to the speaker SP. On the other hand, when there exists no output pulse from the time constant circuit TC at the input of the driver circuit DC, it will be apparent from the above description that the transmission switching circuit $SC_T$ is OFF and the reception switching circuit $SC_R$ is ON.

Accordingly, switching between two modes is provided by the speech control circuit.

However, the prior circuit as mentioned above has the following disadvantages because of the leakage coupling in the hybrid circuit HYB and/or the acoustic coupling between the microphone M and the speaker SP.

Assuming that the hybrid circuit HYB is an ideal one, in the transmission mode, the transmission signal from the microphone M would be perfectly transmitted to the line through the circuit HYB. However, in an actual hybrid circuit, there exists a leakage coupling (as shown by the symbol A in FIG. 1) between the transmission channel and the reception channel resulting from the impedance unbalance of this circuit. Accordingly, some of the transmission signal leaks to the reception channel through the hybrid circuit HYB with some delay time. This leakage signal appearing in the reception channel is called "a false speech signal". Such a false speech signal is then amplified by the reception amplifier $A_R$. At this time, suppose that the true speech transmission signal is amplified by the transmission amplifier $A_T$ and then supplied to the signal detector SD. In this case, if the level of the false speech signal in the reception channel exceeds that of the true speech transmission signal, since the voltage $V_r$ resulting from the false speech signal is larger than the voltage $V_t$, the operational mode would change from the transmission mode to the reception mode, although the correct operational mode is the transmission mode. In particular, the incorrect switching resulting from a false speech signal which appears in the reception channel with some delay time after disappearance of a transmission speech signal in the transmission channel can not be avoided at all in this configuration. These incorrect switching actions are often observed in practical use.

On the other hand, in the reception mode, a reception signal from the line through the hybrid circuit HYB is converted to an acoustic signal by the speaker SP. The acoustic signal is then applied with some delay time to the microphone M by an acoustic coupling (as shown by the symbol B in FIG. 1), and is converted to the electric speech signal by the microphone M, which is also called the false speech signal. This false speech signal is amplified by the transmission amplifier $A_T$ and supplied to the signal detector SD. At this time, suppose that the reception signal is amplified by the reception amplifier $A_R$. Under this condition, if the voltage $V_t$ resulting from the false speech signal is higher than the voltage $V_r$, the operational mode would change from the reception mode to the transmission mode, although the correct operational mode is the reception mode. In particular, the incorrect operation resulting from a false speech signal which appears with some delay time in the transmission channel after disappearance of a reception speech signal in the reception channel can not be avoided at all in this configuration. These incorrect operations are very often observed, in particular, in a handsfree telephone in noisy places such as a car, since a sound level of an acoustic signal from the speaker must be made very high.

Therefore, under these conditions, it is impossible for the circuit of FIG. 1 to provide the correct switching between two modes in accordance with the result of the comparison of the level of the transmission signal with that of the reception signal.

SUMMARY OF THE INVENTION

It is an object, therefore, of the present invention to overcome the disadvantages of a prior speech control circuit by providing a new speech control circuit.

It is also an object of the present invention to provide a speech control circuit which provides the correct switching between the transmission mode and the reception mode in spite of the leakage coupling and/or the acoustic coupling.

According to the invention, there is provided a speech control circuit for a telephone set having at least a microphone (M), a transmission switching circuit ($SC_T$) coupled with the output of the microphone (M), a speaker (SP), a reception switching circuit ($SC_R$), the output of which is coupled with said speaker (SP), a hybrid circuit (HYB) coupled with the output of said transmission switching circuit ($SC_T$), said reception switching circuit ($SC_R$) and a line, and a speech control circuit for controlling switching of said transmission switching circuit ($SC_T$) and said reception switching circuit ($SC_R$), characterized in that said speech control circuit comprises

- a transmission variable gain amplifier ($VGA_T$) coupled with the output of said microphone (M),
- a transmission signal detecting circuit ($SDC_T$) coupled with the output of said transmission variable gain amplifier ($VGA_T$) for detecting a signal from said microphone (M) when the level of an amplified signal therefrom via said transmission variable gain amplifier exceeds a threshold level which is switchable between two levels,
- a first transmission time constant circuit ($FTC_T$) for prolonging the rear edge of an output signal of said transmission signal detecting circuit ($SDC_T$) by a first time constant $\tau_1$,
- a second transmission time constant circuit ($STC_T$) for prolonging the rear edge of the output signal of said transmission signal detecting circuit ($SDC_T$) by a second time constant $\tau_2$,
- a reception variable gain amplifier ($VGA_R$) coupled with the output of said hybrid circuit (HYB) associated with the reception channel,
- a reception signal detecting circuit ($SDC_R$) coupled with the output of said reception variable gain amplifier ($VGA_R$) for detecting a signal from said hybrid circuit (HYB) through the line when the level of an amplified signal therefrom via said reception variable gain amplifier exceeds a threshold level which is switchable between two levels,
- a first reception time constant circuit ($FTC_R$) for prolonging the rear edge of an output signal of said reception signal detecting circuit ($SCD_R$) by said first time constant $\tau_1$, and
- a second reception time constant cirucit ($STC_R$) for prolonging the rear edge of the output signal of said reception signal detecting circuit ($SCD_R$) by said second time constant $\tau_2$,
- said transmission switching cirucit ($SC_T$) being switched by the output signal of said first transmission time constant circuit ($FTC_T$),
- said reception switching cirucit ($SC_R$) being switched by the output signal of said first reception time constant circuit ($FTC_R$),
- the gain of said transmission variable gain amplifier ($VGA_T$) being adjusted by the output signal of said first reception time constant circuit ($FTC_R$),
- the gain of said reception variable gain amplifier ($VGA_R$) being adjusted by the output signal of said first transmission time constant circuit ($FTC_T$),
- said threshold level of said transmission signal detecting circuit ($SDC_T$) being controlled by the output signal of said second reception time constant circuit ($STC_R$),
- said threshold level of said reception signal detecting circuit ($SDC_R$) being controlled by the output signal of said second transmission time constant circuit ($STC_T$),
- said first time constant $\tau_1$ being longer than said second time constant $\tau_2$.

BRIEF DESCRIPTION OF THE DRAWINGS

Further objects, features, and advantages of the present invention can be more fully understood by means of the following description and accompanying drawings wherein.

DESCRIPTION OF THE PREFERRED EMBODIMENTS

Figure 1:
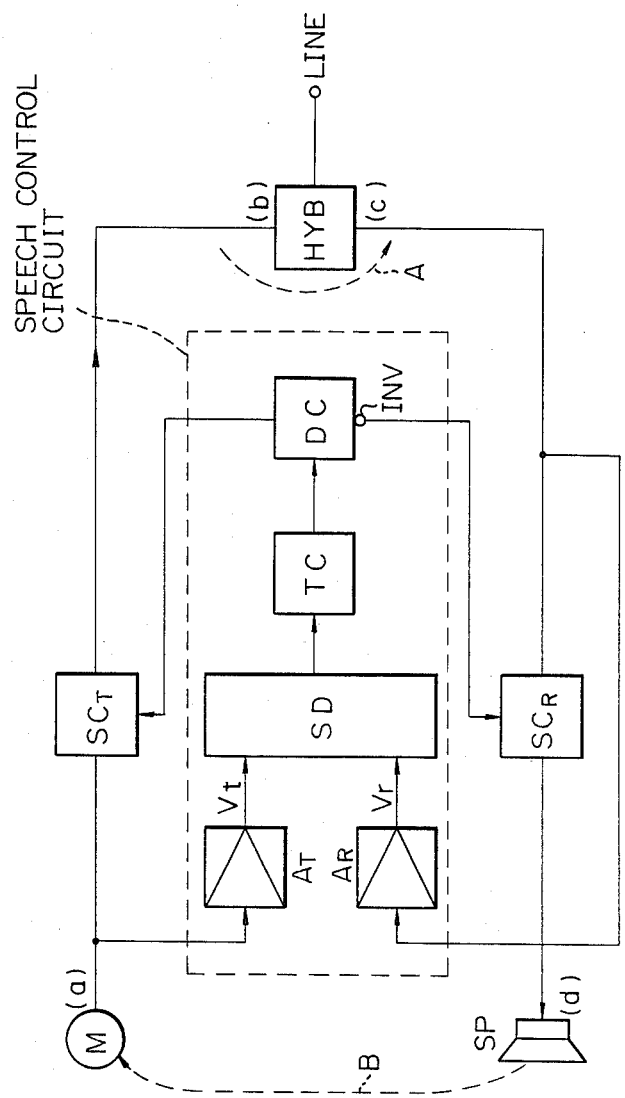
FIG. 1 is a circuit diagram of a prior speech control circuit.
Figure 2:
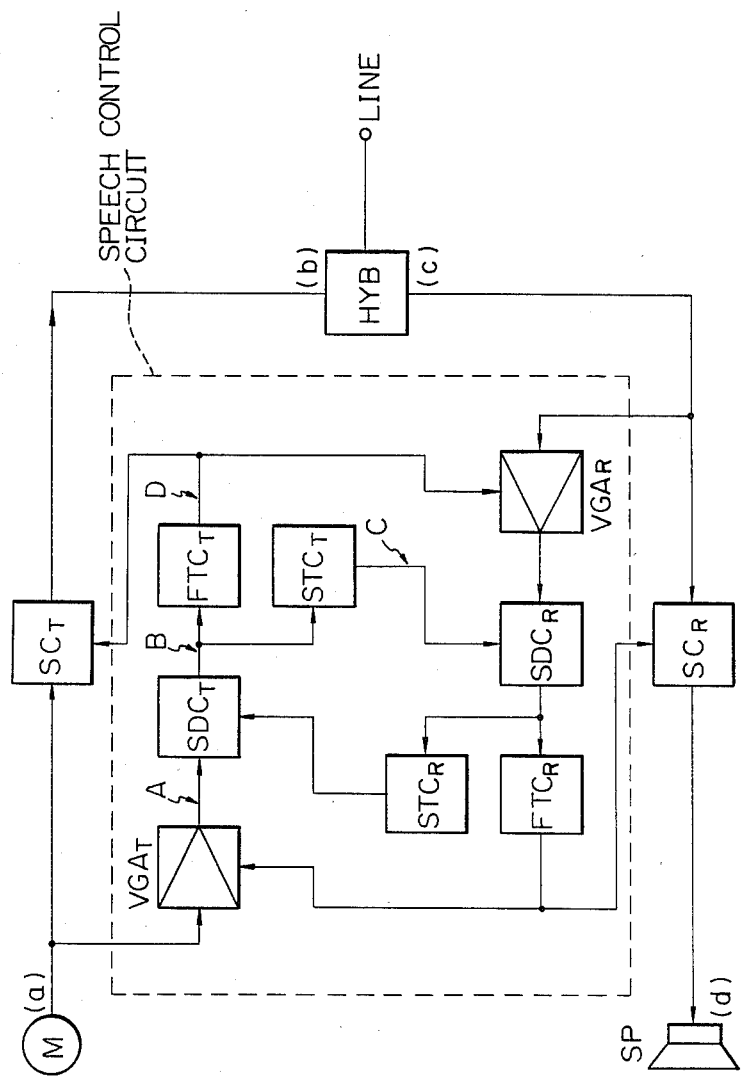
FIG. 2 is a circuit diagram of the speech control circuit in accordance with the present invention.

FIG. 2 shows the circuit diagram of the present speech control circuit utilized in a handsfree telephone or a loudspeaker telephone.

In this figure, the symbol M is a microphone, $SC_T$ is a transmission switching circuit having a switching control input which is inserted into a transmission channel which is defined as a line between (a) and (b), $SC_R$ is a reception switching circuit having a switching control input which is inserted into a reception channel which is defined as a line between (c) and (d), SP is a speaker, and HYB is a hybrid circuit which couples the transmission channel and the reception channel to the line.

Correct switching between a transmission mode and a reception mode of the handsfree telephone is accomplished by a speech control circuit represented by the dotted line, which comprises a transmission variable gain amplifier $VGA_T$ and a reception variable gain amplifier $VGA_R$, a transmission signal detecting circuit $SDC_T$ and a reception signal detecting circuit $SDC_R$, a first transmission time constant circuit $FTC_T$ and a first reception time constant circuit $FTC_R$, and a second transmission time constant circuit $STC_T$ and a second reception time constant circuit $STC_R$, associated with the transmission channel and the reception channel, respectively.

The speech control circuit of FIG. 2 will be described below in detail.

The transmission variable gain amplifier $VGA_T$ and the reception variable gain amplifier $VGA_R$, each having a gain control input, amplify the transmission speech signal and the reception speech signal, respectively. Each gain of the transmission amplifier $VGA_T$ and the reception amplifier $VGA_R$ is switched in either first higher gain or second lower gain in accordance with each gain control signal which is supplied to the respective gain control inputs. In other words, the gain control of the transmission amplifier $VGA_T$ is performed by the first reception time constant circuit $FTC_R$ and the gain control of the reception amplifier $VGA_R$ is performed by the first transmission time constant circuit $FTC_T$.

The outputs of the transmission variable gain amplifier $VGA_T$ and the reception variable gain amplifier $VGA_R$ are connected to one inputs of the transmission signal detecting circuits $SDC_T$ and the reception signal detecting circuit $SDC_R$, respectively, the other inputs of which are connected to the outputs of the second reception time constant circuit $STC_R$ and the second transmission time constant circuit $STC_T$, respectively. The transmission signal detecting circuit $SDC_T$ and the reception signal detecting circuit $SDC_R$ detect the presence of the transmission speech signal and the reception speech signal, respectively. For this purpose, in the transmission signal detecting circuit $SDC_T$, the output voltage of the transmission amplifier $VGA_T$, which changes in accordance with the instantaneous level of the transmission speech signal, is compared with a threshold level which is controlled by the second reception time constant circuit $STC_R$. When the voltage of the amplifier $VGA_T$ exeeds the threshold level, an output pulse in the form of square-wave is produced by the transmission signal detecting circuit $SDC_T$. Similarly, in the reception signal detecting circuit $SDC_R$, the output voltage of the reception amplifier $VGA_R$, which changes in accordance with the instantaneous level of the reception speech signal, is compared with a threshold level which is controlled by the second transmission time constant circuit $STC_T$. The circuit $SDC_R$ can detect the presence of the reception speech signal in the same manner as the circuit $SDC_T$.

Each threshold level of the transmission signal detecting circuit $SDC_T$ and the reception signal detecting circuit $SDC_R$ is switched to first higher state or second lower state. Two states of the threshold level of the circuits $SDC_T$ and $SDC_R$ must be considered in relation to the operation of the variable gain amplifiers $VGA_T$ and $VGA_R$, respectively. For example, in the transmission channel, when the gain of the transmission variable gain amplifier $VGA_T$ is high and the threshold level of the transmission signal detecting circuit $SDC_T$ is relatively low, the circuit $SDC_T$ can detect the presence of the transmission speech signal. Also when the gain of amplifier $VGA_T$ is low and the threshold level of the circuit $SDC_T$ is relatively high, the circuit $SDC_T$ can only detect the presence of the transmission signal having very strong power. Further, when the threshold level of the circuit $SDC_T$ is sufficiently high, the circuit $SDC_T$ can not detect any presence of the transmission speech signal, whether the gain of the amplifier $VGA_T$ is high or low. The reception signal detecting circuit $SDC_R$ operates in the same manner as the transmission signal detecting circuit $SDC_T$ as described above. In operation of the circuit $SDC_T$ or $SDC_R$, the circuit $SDC_T$ or $SDC_R$ with the low threshold level is defined as in ON state, on the other hand the circuit $SDC_T$ or $SDC_R$ with the high threshold level is defined as in OFF state.

The first transmission time constant circuit $FTC_T$ provides the switching control of the transmission switching circuit $SC_T$ and the gain control of the reception variable gain amplifier $VGA_R$ in accordance with the output signal of the transmission signal detecting circuit $SDC_T$. Similarly, the first reception time constant circuit $FTC_R$ provides the switching control of the reception switching circuit $SC_R$ and the gain control of the transmission variable gain amplifier $VGA_T$ in accordance with the output signal of the reception signal detecting circuit $SDC_R$.

The first transmission time constant circuit $FTC_T$ and the first reception time constant circuit $FTC_R$ have the following functions. When an output pulse of the signal detecting circuit $SDC_T(SDC_R)$ having a certain pulse-duration T is supplied to the input of the circuit $FTC_T(FTC_R)$, this circuit produces a simple output pulse having the pulse-duration equal to the sum of T and a first time constant $\tau_1$ of the circuit $FTC_T(FTC_R)$ in synchronization with the leading edge of the output pulse of the circuit $SDC_T(SDC_R)$. This operation is repeated each time the output pulse is applied to the input of the circuit $FTC_T(FTC_R)$. In particular, when two successive output pulses of the circuit $SDC_T(SDC_R)$ having pulse-duration $T_1$ and $T_2$ respectively are applied to the input of the circuit $FTC_T(FTC_R)$ in such a way that the interval $T_3$ between the rear edge of the preceeding pulse and the leading edge of the following pulse is shorter than the first time constant $\tau_1$ of the circuit $FTC_T(FTC_R)$, the circuit $FRC_T(FTC_R)$ produces a simple output pulse in the form of square-wave having the pulse-duration equal to the sum of $T_1$, $T_2$, $T_3$, and $\tau_1$ in synchronization with the leading edge of the preceeding pulse. It will be understood from the above description that the circuit $FTC_T(FTC_R)$ operates similarly when more than two output pulses are successively supplied to the input of the circuit $FTC_T(FTC_R)$ in such a way that each interval between pulses is shorter than the first time constant $\tau_1$.

Application of the output pulse of the first transmission time constant circuit $FTC_T$ to the switching control input of the transmission switching circuit $SC_T$ causes this switch to be ON and causes the gain of the reception variable gain amplifier $VGA_R$ to be low. In other words, the presence of the output pulses of the circuit $FTC_T$ means that the operational mode is determined to be the transmission mode. Similarly, application of the output pulse of the first reception time constant circuit $FTC_R$ to the switching control input of the reception switching circuit $SC_R$ causes this switch to be ON and causes the gain of the transmission variable gain amplifier $VGA_T$ to be small.

The first time constant $\tau_1$ of the first time constant circuit $FTC_T$ or $FTC_R$ is an important feature to prevent the incorrect switching of the operational mode, in particular, resulting from the presence of a false speech signal having strong power that will be described afterwards in detail and to prevent a break of speech.

The second transmission time constant circuit $STC_T$ and the second reception time constant circuit $STC_R$ control the threshold levels of the reception signal detecting circuit $SDV_R$ and the transmission signal detecting circuit $SDC_T$, respectively. The output of the transmission signal detecting circuit $SDC_T$ is connected to the input of the circuit $STC_T$, the output of which is connected to the reception signal detecting circuit $SDC_R$. Similarly, the output of the reception signal detecting circuit $SDC_R$ is connected to the input of the second reception time constant circuit $STC_R$, the output of which is connected to the transmission signal detecting circuit $SDC_T$. Each of circuits $STC_T$ and $STC_R$ has an identical structure, and further has the same structure as each of the first time constant circuits $FTC_T$ and $FTC_R$ with the exception that a second time constant $\tau_2$ of the second time constant circuit is shorter than $\tau_1$ of the first time constant circuit. The second time constant $\tau_2$ is also an important feature to prevent incorrect switching of the operational mode, in particular, resulting from the presence of a false speech signal having weak power. The second time constant circuit $STC_T(STC_R)$ produces an output pulse in the form of a square-wave according to an output pulse of the output signal of the circuit $STC_T(STC_R)$. In the threshold level control, on the one hand, when an output pulse of the second time constant circuit $STC_T(STC_R)$ is supplied to the signal detecting circuit $SDC_R(SDC_T)$, the threshold level of this circuit is made high, and thus this circuit is controlled to be OFF. On the other hand, when no output pulse of the circuit $STC_T(STC_R)$ exists, the threshold level of this circuit is made low, and thus this circuit is controlled to be ON.

Figure 3:
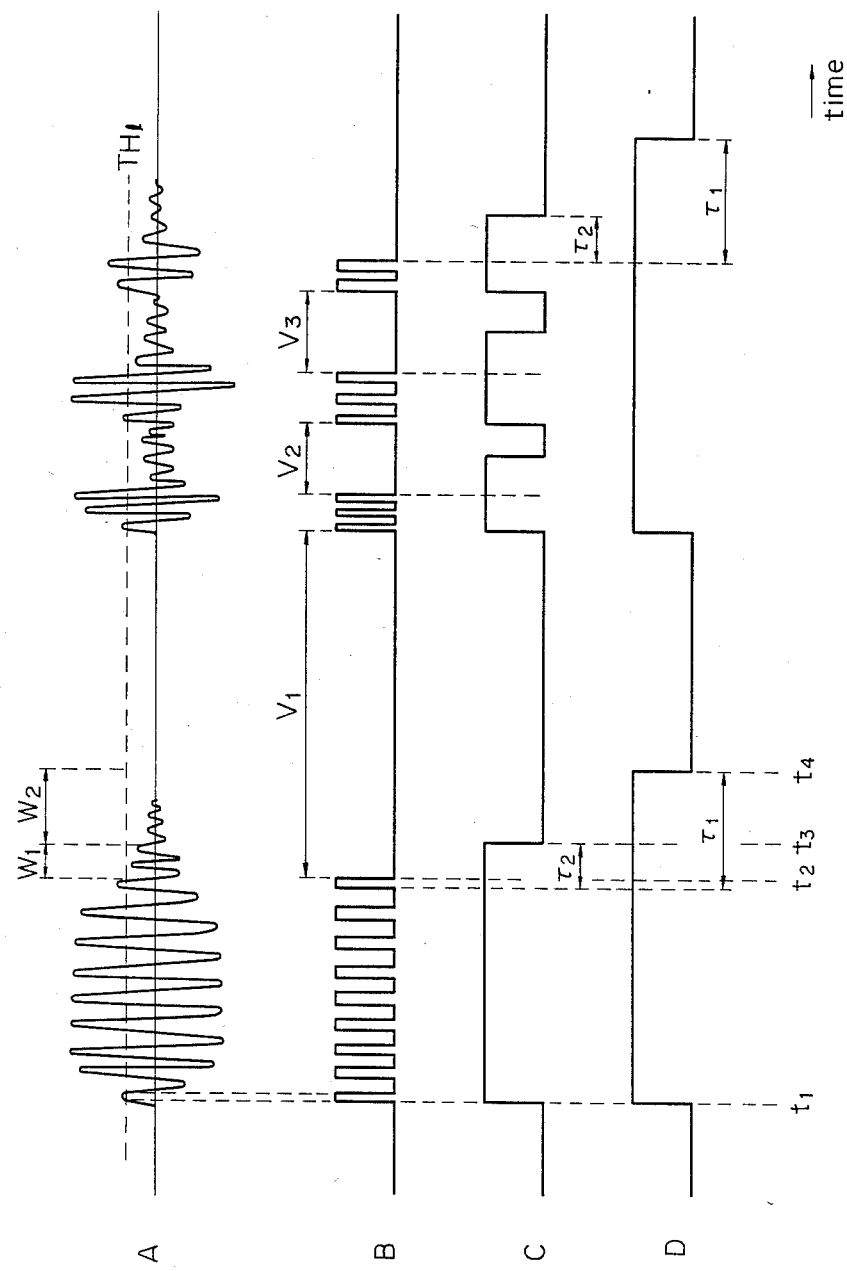
FIGS. 3A to 3D represent diagrams of signals for the explanation of the operation of the speech control circuit of FIG. 2.

The operation of FIG. 2 is explained in accordance with the waveforms in FIG. 3. In FIG. 3, the waveforms A,B,C, and D show the operational waveforms at the points of the same symbols in the circuit of FIG. 2.

When no transmission speech signal nor reception speech signal exists, each of the gains of the variable gain amplifiers $VGA_T$ and $VGA_R$ is high and each of the threshold levels of the signal detecting circuits $SDC_T$ and $SDC_R$ is low. Since the circuits $SDC_T$ and $SDC_R$ detect no speech signals respectively, the transmission switching circuit $SC_T$ and the reception switching circuit $SC_R$ are in OFF state. Accordingly, the handsfree telephone is neither in the transmission mode nor in the reception mode.

When a transmission speech signal is detected by the transmission signal detecting circuit $SDC_T$, the handsfree telephone operates in the transmission mode. Simultaneously, the gain of the reception variable gain amplifier $VGA_R$ is controlled to be low by the transmission first time constant circuit $FTC_T$ and the threshold level of the reception signal detecting circuit $SDC_R$ is controlled to be high (or in OFF) by the second transmission time constant circuit $STC_T$. On the other hand, when a reception speech signal is detected by the reception signal detecting circuit $SDC_R$, the handsfree telephone operates in the reception mode. Simultaneously, the gain of the transmission variable gain amplifier $VGA_T$ is controlled to be low by first reception time constant circuit $FTC_R$ and the threshold level of the transmission signal detecting circuit $SDC_T$ is controlled to be high by the second reception time constant circuit $STC_R$.

The operation of the speech control circuit will now be described in more detail.

For instance, when a transmission speech signal is derived from the microphone M, this speech signal is amplified by the transmission amplifier $VGA_T$ whose gain is high and supplied to the transmission signal detecting circuit $SDC_T$. One example of the amplified transmission signal is shown in FIG. 3A. The amplified signal of FIG. 3A is then compared with the low threshold level $TH_1$ (shown in FIG. 3A) by the circuit $SDC_T$. The output signal of this circuit according to the result of comparison is shown in FIG. 3B, in which the output signal is composed of several pulses. In FIG. 3B, suppose now that the interval $V_1$ is longer than the first time constant $\tau_1$ and the second time constant $\tau_2$, and each of intervals $V_2$ and $V_3$ is shorter than the first time constants $\tau_1$ and is longer than the second time constant $\tau_2$. The signal of FIG. 3B is fed to both the first transmission time constant circuits $FTC_T$ and the second transmission time constant circuit $STC_T$.

On the one hand, in response to the signal of FIG. 3B, the second transmission time constant circuit $STC_T$ supplies the signal shown in FIG. 3C to the reception signal detecting circuit $SDC_R$. Each of four pulses of FIG. 3C causes the threshold level of the reception signal detecting circuit $SDC_R$ to be high. That is to say, the circuit $SDC_R$ is held in OFF so long as the output pulse is supplied from the second transmission time constant circuit $STC_T$ to the reception signal detecting circuit $SDC_R$. Accordingly, when this condition is satisfied, even if there exists in the reception channel a reception speech signal from the line or a false speech signal from the transmission channel through the hybrid circuit HYB, that signal would never be detected by the reception signal detecting circuit $SDC_R$. Accordingly, the reception switching circuit $SC_R$ is controlled to be OFF during the presence of the transmission speech signal, although there exists a reception speech signal or a false speech signal in the reception channel. In particular, it should be noted that even if a false speech signal with strong power resulting from a portion $W_1$ of the transmission signal of FIG. 3A leaks in the reception channel during the second time constant $\tau_2$, for example, corresponding to the interval between the time $t_2$ and $t_3$, since the reception signal detecting circuit $SDC_R$ is OFF, the reception switching circuit $SC_R$ would be held in OFF. In practical use, the second time constant circuit $\tau_2$ is preferably in the range from 0.1 to 0.2 second in order to prevent the incorrect operation resulting from a false speech signal having strong power.

On the other hand, in accordance with the signal of FIG. 3B, the first time constant circuit $FTC_T$ supplies the signal shown in FIG. 3D to the switching control input of the transmission switching circuit $SC_T$ and the gain control input of the transmission variable gain amplifier $VGA_R$. Each of two pulses of FIG. 3D causes the transmission switching circuit $SC_T$ to be ON and causes the gain of the reception variable gain amplifier $VGA_R$ to be low. In this case, it should be noted that the first time constant $\tau_1$ of the first transmission time constant circuit $FTC_T$ is made longer than the second time constant $\tau_2$ of the second transmission time constant circuit $STC_T$. Accordingly, there exist the following two states in operation.

First, when there exist both the output pulse from the first transmission time constant circuit $FTC_T$ shown in FIG. 3C and that from the second transmission time constant circuit $STC_T$ shown in FIG. 3D, which corresponds to the interval, for instance, between the time $t_1$ and $t_3$, since the reception signal detecting circuit $SDC_R$ is OFF, it detects no speech signal as previously mentioned, the transmission mode being held. Secondly, when there exists the output pulse from the first transmission time constant circuit $FTC_T$ but there exists no output pulse from the second transmission time constant circuit $STC_T$, which corresponds to the interval, for instance, between the time $t_3$ and $t_4$, the gain of the reception amplifier $VGA_R$ is controlled to be low by the first transmission time constant circuit $FTC_T$, and the reception signal detecting circuit $SDC_R$ is controlled to be ON by the second time constant circuit $STC_T$. With the gain of the reception amplifier $VGA_R$ being low, the reception signal detecting circuit $SDC_R$ can detect no speech signal, that is, a reception signal or a false speech signal, except for a speech signal having very strong power, as mentioned above. In this case, it should be noted that even if a false speech signal with weak power, for instance, resulting from a portion $W_2$ of the transmission signal of FIG. 3A appears in the reception channel during the first time constant $\tau_1$, since the gain of the reception variable gain amplifier $VGA_R$ is controlled to be low, the reception switching circuit $SC_R$ would be held in OFF. In practical use, the first time constant circuit $\tau_1$ is preferably in the range from 0.3 to 0.6 second in order to prevent the incorrect operation resulting from a false speech signal having weak power.

In this second condition, if a reception speech signal having very strong power appears in the reception channel, the operational mode will be changed from the transmission mode to the reception mode. However, it will be apparent that this change is correct and gives rise to no problem.

As mentioned above, according to the present circuit, the incorrect operation of a false speech signal with strong power is prevented by means of the second time constant $\tau_2$ and that of a false speech signal with weak power is prevented by means of the first time constant $\tau_1$.

It will be seen from the above description that according to the invention, the correct switching operation between the transmission mode and the reception mode can provided in spite of the presence of the false speech signal resulting from the leakage coupling in the hybrid circuit.

Likewise, the operation of the circuit of FIG. 2 in the reception mode will be also understood from the above-mentioned description similarly. In this case, the correct switching is provided in spite of the presence of the false speech signal resulting from the acoustic coupling between the microphone and the speaker. The present circuit ensures the correct switching under severe conditions where the sound pressure level of voice of a man for the microphone is of the order of 70–80 dB SPL (Sound Pressure Level) and that of the acoustic signal from the speaker is of the order of 90–100 dB SPL.

The present invention is very useful for use in a handsfree telephone or a loudspeaker telephone in which a speaker is mounted close to a microphone.

Figure 4:
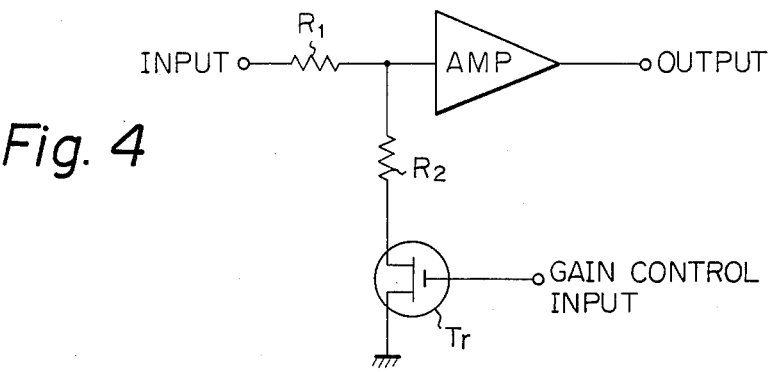
FIG. 4 shows detailed circuit structure of the variable gain amplifier.

FIG. 4 illustrates detailed circuit structure of the transmission variable gain amplifier $VGA_T$ or the reception variable gain amplifier $VGA_R$, which comprises an attenuator composed of the resistors $R_1$ and $R_2$, an amplifier AMP having a constant gain, and a switching transistor Tr. The gate of the transistor Tr associated with one channel is connected to the output of the first time constant circuit associated with the other channel. ON/OFF control of the transister Tr is acheived by pulse from the first time constant circuit associated with the other channel. In operation, when the transistor Tr is turned-on in response to the pulse at the gain control input, since the resistor $R_2$ is connected to the ground through the transistor $T_r$ some of the speech signal flows to the ground through the resistor $R_2$ and the transistor Tr. Accordingly, the gain of the variable gain amplifier is controlled to be low. On the other hand, when the transistor Tr is turned-off because of the absence of pulse at the gain control input, since the registor $R_2$ is disconnected from the ground, all of the speech signal passes through the resistor $R_1$ and is amplified by the amplifier AMP. Accordingly, the gain of the variable gain amplifier is controlled to be high.

Figure 5:
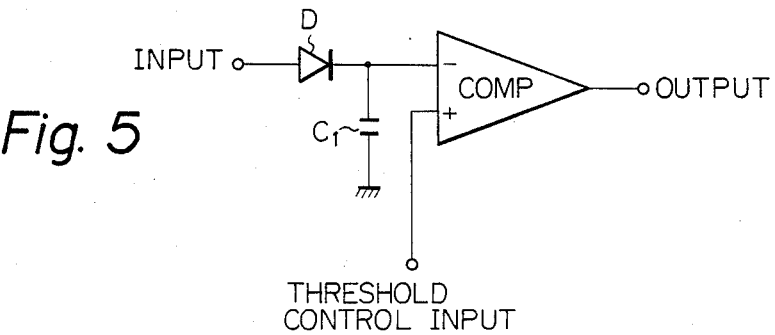
FIG. 5 shows detailed circuit structure of the signal detecting circuit.

FIG. 5 illustrates detail circuit structure of the transmission signal detecting circuit $SDC_T$ or the reception signal detecting circuit $SDC_R$, which comprises a diode D, capacitor $C_1$, and a comparator COMP. A signal which is supplied to the non-inverting input, or threshold control input by the second time constant circuit associated with the other channel is used as a threshold. In the threshold control, when there exists no pulse at the non-inverting circuit, the threshold level is controlled to be low, and then the signal detecting circuit is ON. When there exists a pulse at the non-inverting circuit, the threshold level is controlled to be high, and then the signal detecting circuit is substantially OFF. In operation, the output signal of the variable gain amplifier associated with one channel is rectified by the diode D and the capacitor $C_1$ and then supplied to the inverting input of the comparator COMP, the non-inverting input of which is connected to the output of the second time constant circuit associated with the other channel. In this case, the comparator produces an output pulse when a signal at the inverting input is higher than a threshold level at the non-inverting input. In the reverse case, no output pulse is produced.

Figure 6:
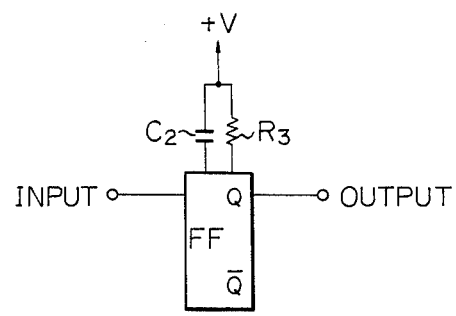
FIG. 6 shows detailed circuit structure of a time constant circuit.

FIG. 6 shows detailed circuit structure of the first time constant circuit or the second time constant circuit. The illustrative circuit comprises a flip-flop FF and a pair of resistor $R_3$ and capacitor $C_2$.

Each of the terminals of the resistor $R_3$ and the capacitor $C_2$ is connected to the respective time constant control inputs of the flip-flop FF. The joint connection point of the resistor $R_3$ and the capacitor $C_2$ is connected to a power supply (not shown). The first time constant $\tau_1$ or the second time constant $\tau_2$ is proportional to the product of the capacitance of the capacitor $C_2$ and the resistance of the resistor $R_3$. The flip-flop FF can operate as follows. When a input pulse exists at the input, the output is made "1". In this case, even if the input pulse disappears, the output is still made "1" during the time constant $\tau_1$ or $\tau_2$.

The above detailed description is illustrative of one embodiment of the invention, and it is to be understood that additional embodiments thereof will be obvious to those skilled in the art. The embodiment described herein together with those additional embodiments are considered to be within the scope of the invention.

What is claimed is:

1. A speech control circuit for a telephone set having at least a microphone (M), a transmission switching circuit ($SC_T$) coupled with the output of the microphone (M), a speaker (SP), a reception switching circuit ($SC_R$), the output of which is coupled with said speaker (SP), a hybrid circuit (HYB) coupled with the output of said transmission switching circuit ($SC_T$), said reception switching circuit ($SC_R$) and a line, and a speech control circuit for controlling switching of said transmission switching circuit ($SC_T$) and said reception switching circuit ($SC_R$), characterized in that
said speech control circuit comprises
a transmission variable gain amplifier ($VGA_T$) coupled with the output of said microphone (M),
a transmission signal detecting circuit ($SDC_T$) coupled with the output of said transmission variable gain amplifier ($VGA_T$) for detecting a signal from said microphone (M) when the level of an amplified signal therefrom via said transmission variable gain amplifier exceeds a threshold level which is switchable between two levels,
a first transmission time constant circuit ($FTC_T$) for prolonging the rear edge of an output signal of said transmission signal detecting circuit ($SDC_T$) by a first transmission time constant $t_{t1}$,
a second transmission time constant circuit ($STC_T$) for prolonging the rear edge of the output signal of said transmission signal detecting circuit ($SDC_T$) by a second transmission time constant $t_{t2}$,
a reception variable gain amplifier ($VGA_R$) coupled with the output of said hybrid circuit (HYB) associated with the reception channel,
a reception signal detecting circuit ($SDC_R$) coupled with the output of said reception variable gain amplifier ($VGA_R$) for detecting a signal from said hybrid circuit (HYB) when the level of an amplifier signal therefrom via said reception variable gain amplifier exceeds a threshold level which is switchable between two levels,
a first reception time constant circuit ($FTC_R$) for prolonging the rear edge of an output signal of said reception signal detecting circuit ($SDC_R$) by a first reception time constant $t_{r1}$, and
a second reception time constant circuit ($STC_R$) for prolonging the rear edge of the output signal of said reception signal detecting circuit ($SDC_R$) by a second reception time constant $t_{r2}$,
said transmission switching circuit ($SC_T$) being switched by the output signal of said first transmission time constant circuit ($FTC_T$),
said reception switching circuit ($SC_R$) being switched by the output signal of said first reception time constant circuit ($FTC_R$),
the gain of said transmission variable gain amplifier ($VGA_T$) being adjusted by the output signal of said first reception time constant circuit ($FTC_R$),
the gain of said reception variable gain amplifier ($VGA_R$) being adjusted by the output signal of said first transmission time constant circuit ($FTC_T$),
said threshold level of said transmission signal detecting circuit ($SDC_T$) being controlled by the output signal of said second reception time constant circuit ($STC_R$),
said threshold level of said reception signal detecting circuit ($SDC_R$) being controlled by the output signal of said second transmission time constant circuit ($STC_T$),
said first transmission and reception time constants $t_{t1}$ and $t_{r1}$, being respectively longer than said second transmission and reception time constants $t_{t2}$ and $t_{r2}$.

2. A circuit in accordance with claim 1, wherein each of said transmission signal detecting circuit ($SDC_T$) and said reception signal detecting circuit ($SDC_R$) provides an active output signal, when the presence of respective speech signals is detected and when the absence of respective speech signal is detected, no output pulse is produced, respectively.

3. A circuit in accordance with claim 1, wherein said first transmission and reception time constants $t_{t1}$ and $t_{r1}$ are in the range from 0.3 to 0.6 second, and said second transmission and reception time constants $t_{t2}$ and $t_{r2}$ are in the range from 0.1 to 0.2 second.

4. A circuit in accordance with claim 1, wherein each of said transmission variable gain amplifier ($VGA_T$) and said reception variable gain amplifier ($VGA_R$) (FIG. 4) comprises an amplifier (AMP), whose output is the output of said variable gain amplifier, a first resistor ($R_1$), which is connected to the input of said amplifier (AMP) and the input of said variable gain amplifier, a second resistor ($R_2$), which is connected to the input of said amplifier (AMP) and a ground through a transistor switch ($T_r$), the gate terminal of which is a gain control input.

5. A circuit in accordance with claim 1, wherein each of said transmission signal detecting circuit ($SDC_T$) and said reception signal detecting circuit ($SDC_R$) (FIG. 5) comprises a comparator (COMP), the output of which is the output of said signal detecting circuit, the non-inverting input of which is a threshold control input, a diode (D), the cathode terminal of which is connected to the inverting input of said comparator (COMP), the anode terminal of said diode (D) is the input of said signal detecting circuit, and a capacitor ($C_1$) connected to the non-inverting input of said comparator (COMP) and the ground.

6. A circuit in accordance with claim 1, wherein each of said first transmission time constant circuit ($FTC_T$), said first reception time constant circuit ($FTC_R$), said second transmission time constant circuit ($STC_T$) and said second reception time constant circuit ($STC_R$) (FIG. 6) comprises a flip-flop (FF) and a time constant circuit with a resistor ($R_3$) and a capacitor ($C_2$) coupled with a power supply, wherein a rear edge of an input signal of said flip-flop with some delay time is defined by said time constant circuit ($C_2$, $R_3$).

* * * * *